United States Patent
Carlsen et al.

(10) Patent No.: US 6,466,210 B1
(45) Date of Patent: Oct. 15, 2002

(54) BLENDING IMAGE DATA USING LAYERS

(75) Inventors: Stephen E. Carlsen, Issaquah, WA (US); Stephen N. Schiller, Hayward; Lars U. Borg, Saratoga, both of CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 08/995,592

(22) Filed: Dec. 22, 1997

(51) Int. Cl.$^7$ .................................................. G09G 5/00
(52) U.S. Cl. .................... 345/435; 345/629; 345/641
(58) Field of Search ........................ 345/113–115, 435, 345/426, 427; 382/284; 395/418

(56) References Cited

U.S. PATENT DOCUMENTS

| | | | |
|---|---|---|---|
| 5,425,137 A | * 6/1995 | Mohan et al. | 345/433 |
| 5,542,052 A | * 7/1996 | Deutsch et al. | 345/431 |
| 5,600,768 A | 2/1997 | Andersen | 395/135 |
| 5,737,455 A | * 4/1998 | Harrington et al. | 382/284 |
| 5,864,342 A | * 1/1999 | Kajiya et al. | 345/418 |
| 6,016,150 A | * 1/2000 | Lengyel et al. | 345/426 |
| 6,064,393 A | * 1/2000 | Lengyel et al. | 345/427 |
| 6,049,339 A | * 4/2000 | Schiller | 345/435 |

FOREIGN PATENT DOCUMENTS

| | | | |
|---|---|---|---|
| EP | 0473340 A2 | 3/1992 | G06F/15/72 |
| EP | 0497344 A2 | 8/1992 | G06F/15/72 |
| EP | 0568361 A2 | 11/1993 | G06F/15/72 |
| EP | 0702328 A2 | 3/1996 | G06T/11/00 |
| WO | WO 94/22101 | 9/1994 | G06F/15/72 |

OTHER PUBLICATIONS

Denbrook, Craig L., "Artistry in Layers: Generating Color Transparencies," Computer Design vol. 21, pp. 155–163, (1982) Jul., No. 7, Winchester, Mass, USA.

* cited by examiner

*Primary Examiner*—Matthew Luu
(74) *Attorney, Agent, or Firm*—Fish & Richardson P.C.

(57) ABSTRACT

Methods and apparatus for blending graphics data that includes a plurality of objects. In one aspect, objects are grouped into two layers; objects associated with a first layer are drawn; objects associated with a second layer are drawn; and data drawn into the first and second layers is blended. A layer stack may be used to define a hierarchy for blending layers of the image. The apparatus may be an output display device and more particularly a printing device. The object data may be transformed to an intermediate form and the intermediate form data for the first and second layer may be blended. The apparatus may include an interpreter for receiving object data associated with two layers of an image and for receiving a layer operator for designating which objects belong to which layer; a drawing engine for drawing objects into a first and a second buffer for a first layer and a second layer, respectively; and a blend processor for blending data in the first and second buffers. The apparatus may be a printer configured to receive a page description language description of a page to be printed.

8 Claims, 7 Drawing Sheets

BLENDING IMAGE DATA USING LAYERS

BACKGROUND OF THE INVENTION

The present invention relates generally to methods and systems for blending computer generated graphics objects and more particularly to methods and apparatus for blending computer generated graphics objects using layers.

A computer system can output data to a wide variety of output display devices. Output display devices such as laser printers, plotters, image setters and other printing devices produce an image or "visual representation" onto a sheet of paper, a piece of film or the like, while output display devices such as computer monitors develop visual representations on a computer screen.

Many output display devices receive display data in the form of a "pixelmap" and generate visual representations from the display data. A pixel is a fundamental picture element of a visual representation generated by a display device, and a pixelmap is a data structure including information concerning a number of pixels of the representation.

A printing device prints dots on a piece of paper corresponding to the information in a pixelmap. Alternatively, a computer monitor illuminates pixels based upon the information in a pixelmap. A "raster" output device creates a visual representation by displaying arrays of pixels arranged in rows and columns from the pixelmap. Most output devices, other than plotters, are raster output devices.

Printing and visual output devices that produce output in response to page description language input are widely used. A page description language is a high level language for describing objects to be displayed by an output device. The PostScript® language developed by Adobe Systems Incorporated of San Jose, Calif., is an example of a page description language. An image to be displayed may be represented and stored in a page description format as a page description language file which includes one or more objects. Generally, a page description language is device independent.

In operation, a conventional printing device configured to process a page description language file interprets the objects within the file and renders the data into pixelmaps to be painted into a frame buffer. Typically, the frame buffer is large enough to store (at least in compressed form) any page that might be printed, and rendered pixelmaps are stored in this buffer. When the entire page has been painted, data stored in the frame buffer may transferred to a print engine or marking engine for printing.

Transparency is a visual blending effect obtained when a background object (image, text, lines or filled regions) is partially obscured by a foreground object that is drawn over the background object. Numerous other blending effects may be used to integrate foreground and background graphics data. Examples of blending effects include a drop shadow effect, a screen effect, darker and lighter effects and overprinting effects.

The manipulation of graphics data at a printer or output display to achieve blending effects typically requires a large amount of memory. Some printing devices include limited memory or shallow frame buffers for performance reasons and thus heretofore were incapable of processing a blending operation at the printer. Recognizing the limitations of some printing devices to manipulate graphics data, PostScript and other similar page description languages generally have not supported blending effects.

SUMMARY

In general, in one aspect, the invention features a method of blending graphics data that includes a plurality of objects. The method includes grouping the objects into two layers; drawing the objects associated with a first layer; drawing the objects associated with a second layer; and blending data drawn into the first and second layers.

Preferred embodiments of the invention include one or more of the following features. The drawing step includes rendering object data to generate a pixelmap. The drawing step includes computing a planar map representation of the objects. The method is implemented in a printing device. Objects are drawn opaquely into each layer. One of the first and second layers is drawn into a frame buffer. Data drawn into one of the first and second layers is drawn into a layer buffer, the layer buffer being partitioned into a plurality of tiles, each tile for receiving data associated with a particular portion of a page to be printed; the method includes compressing tiles of the layer buffer into which data is not currently being drawn. The layer buffer is partitioned into a plurality of bands. The step of blending includes blending drawn data from the first and second layer according to a predefined blending operation. The predefined blending operation is selected from the group of transparency, shadow, overprinting, darkening, lightening, screen effect and additive effect.

In general, in another aspect, the invention features a method of blending graphics data in an output display device. The method includes providing groupings of object data associated with an image to be displayed, each grouping defining a layer of the image; creating a layer stack associated with image, the layer stack defining a hierarchy for blending layers of the image; rendering object data associated with each layer; and blending rendered object data for the layers.

Preferred embodiments of the invention include one or more of the following features. The blending step is performed two layers at time, including selecting layers for blending by popping layers off the layer stack.

In general, in another aspect, the invention features a method of blending graphics data in an output display device. The method includes providing groupings of object data associated with an image to be displayed, each grouping defining a layer of the image; providing layer blending information defining a hierarchy for blending layers of the image; rendering object data associated with each layer; and blending rendered object data for the layers.

Preferred embodiments of the invention include one or more of the following features. The blending step is performed two layers at time including selecting layers for blending based on the layer blending information.

In general, in another aspect, the invention features a method of blending graphics data received by a printing device. The method includes receiving object data associated with a first layer of an image to be displayed; transforming the object data to an intermediate form representative of an underlying graphics object; storing the intermediate form data in a first buffer; receiving object data associated with a second layer of the image; transforming the object data to an intermediate form representative of an underlying graphics object; blending intermediate form data for the first and second layer to derive blended data; and printing the image.

In general, in another aspect, the invention features a method of blending graphics data received by a printing device to provide a blending effect for a foreground image with respect to a background image. The method includes receiving one or more foreground objects to be drawn into a foreground layer; drawing the foreground objects to generate foreground data; receiving one or more of background objects to be drawn into a background layer; drawing the background objects to generate background data; blending the foreground and background data to generate a composite image for printing.

In general, in another aspect, the invention features a method of blending graphics data received by a printing device. The method includes providing one or more objects associated with a first layer of an image to be printed; rendering the objects associated with the first layer; storing rendered object data associated with the first layer in a first buffer; providing one or more objects associated with a second layer of the image; rendering the objects associated with the second layer; storing rendered object data associated with the second layer in a second buffer; blending the rendered object data for the first and second layers; and printing the blended rendered object data.

In general, in another aspect, the invention features an apparatus for blending graphics data in a output display device. The apparatus includes an interpreter for receiving object data associated with two layers of an image to be displayed by the output display device and for receiving a layer operator for designating which objects belong to which layer; a drawing engine for drawing objects into a first and a second buffer, the first buffer for receiving data associated with a first layer and the second buffer for receiving data associated with a second layer; and a blend processor for blending data in the first and second buffers prior to display.

Preferred embodiments of the invention include one or more of the following features. One of the first and second buffers is a layer buffer, the layer buffer being partitioned into a plurality of bands, each band for receiving data associated with a particular portion of a page to be displayed; and the apparatus includes a compression engine for compressing bands of the layer buffer into which data is not currently being drawn. The drawing engine includes a render engine for generating pixel data from higher level object data, for receiving object data from the interpreter and for painting pixel data representative of the object data into one of the first and second buffers for all objects in a same layer. The apparatus includes a layer table for storing layer information including blending instructions to direct the output display device to perform a desired blend. The interpreter receives a layer operator indicating a transition between layers and, responsive to the layer operator, data is drawn into a new layer buffer.

In general, in another aspect, the invention features an apparatus for blending graphics data in a output display device. The apparatus includes a frame buffer for storing rendered object data associated with a plurality of objects to be placed in a background layer of an image; a layer buffer for storing rendered object data associated a plurality of objects to be placed in a foreground layer of an image; and a blend processor for blending the foreground and background layers.

Preferred embodiments of the invention include one or more of the following features. The layer buffer is dynamically allocatable and de-allocatable based in part upon receipt of a blending instruction with graphics objects associated with the image.

In general, in another aspect, the invention features a printer configured to receive a page description language description of a page to be printed. The printer includes a frame buffer for storing render data; a layer buffer for temporarily storing rendered data for a layer of an image to printed; a blending engine for blending rendered data stored in the frame buffer and layer buffer; and a print engine for printing blended data resulting in a blending of graphics data according to a user defined blending function.

Among the advantages of the invention are one or more of the following. Blending effects may be implemented in printers that would otherwise not have sufficient memory to support conventional blending methods.

The use of the inventive methods is transparent for non-blended graphics data and thus a performance penalty only occurs when processing blended graphics objects.

A layering process is provided in a display device to allow for division of an image or portion of an image into one or more layers. Blending of objects associated with one or more layers of an image may thereafter be advantageously achieved.

A layering process may be advantageously implemented in systems that manipulate graphics data in display list format or in other formats.

Only a current layer that is being drawn into is required to be maintained in uncompressed form. All other layers may be compressed to save memory space.

In a banding or tiling system, only a portion of the current layer is required to be in an uncompressed form. Bands not being drawn into may be stored in a compressed form.

Layers may be blended in any order and combination to achieve a desired visual effect in the output image. Layers may be nested in multiple layers and resolved according to user preferences in the formulation of an output image which is delivered to a print or display engine.

A simple stack hierarchy may be used to define relationships between layers and the ordering for blending of the layers in the formulation of blended graphics objects.

Layer buffers may be allocated and deallocated dynamically as required to create a desired visual effect. Any number of combinations of differing sized layer buffers may be active at any given time.

Blending effects may be implemented that otherwise would be impossible in a conventional output display device. The inventive teachings disclosed allow for the elimination of undesirable artifacts and other cumulative effects in blending multiple objects.

Other features and advantages of the invention will become apparent from the following description and from the claims.

DETAILED DESCRIPTION

The following contemporaneously filed and commonly owned patent applications are incorporated by reference: "Dehalftoning of Digital Images" by Stephen Carlsen et al., "Blending Graphics Objects In A Frame Buffer" by Stephen Carlsen, "Transparency Processing in a Page Description Language" by Lars Borg et al., "Blending with Planar Maps" by Stephen Schiller et al., and "Conversion of Alpha-Multiplied Color Data" by Lars Borg et al.

The present invention may be embodied in any output display device that receives page description data and produces an output image from the data, for example on a computer monitor or a piece of paper. The invention has particular applicability to printing devices and will be described in terms of an embodiment in such a device, which will be referred to simply as a printer. Printers include plotters, image setters, digital presses, laser printers, dot matrix printers, ink jet printers and the like.

Figure 1:
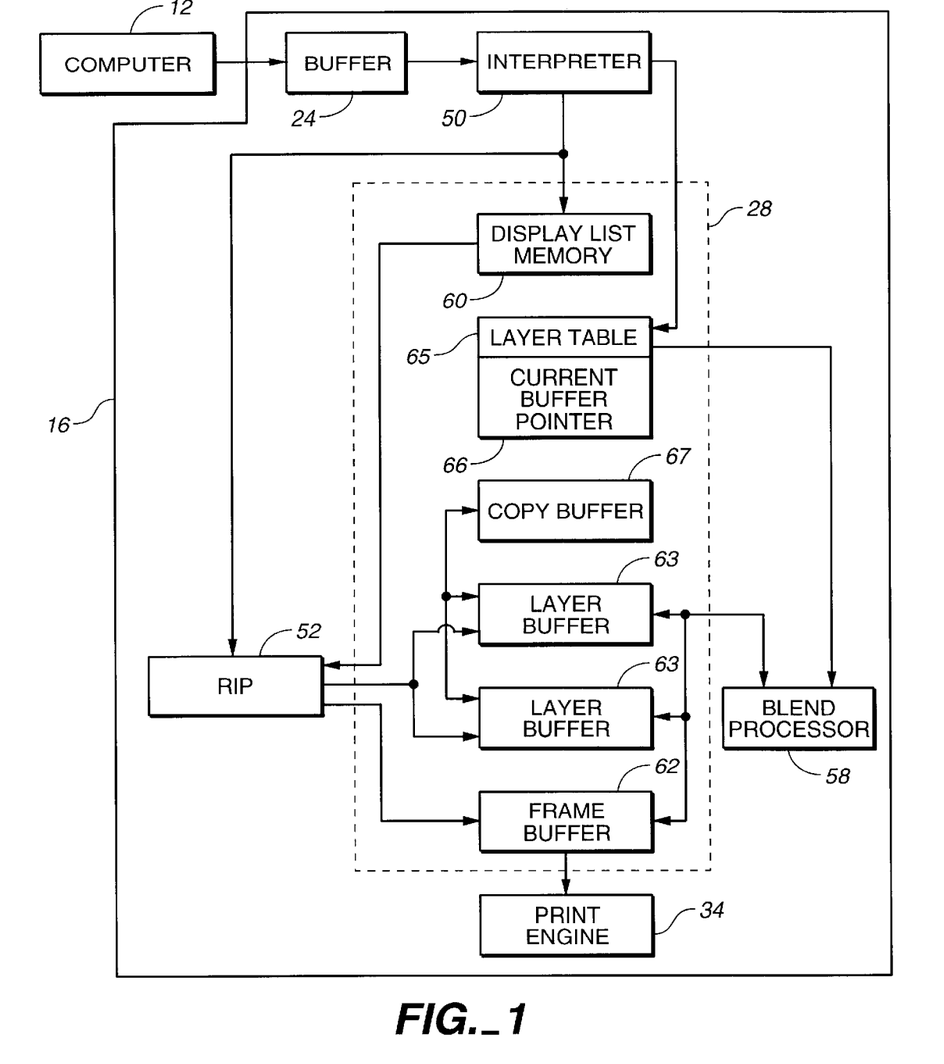
FIG. 1 is a block diagram of a printer according to the invention.

Referring to FIG. 1, a printer 16 receives input data, from a computer 12, for example, and turns the input data into marks on a piece of paper by sending signals to a print engine 34. The printer 16 is configured to receive page description language input data and process it as will be described later. One suitable page description language is the PostScript language. The PostScript language is described in Adobe Systems Incorporated, Adobe PostScript® Language Reference Manual, Addison-Wesley (2d ed., ©1990). Another suitable page description language is the PCL language available from the Hewlett-Packard Company of Palo Alto, Calif. A page description language file sent to a printer specifies objects to be displayed and related information. A PostScript object can, for example, include a pixelmap defining a pattern of pixels to be displayed, or the object may reference an outline curve defining a shape to be marked. The object may also include other information such as font and size for character objects and blend information as will be described in greater detail below.

The printer 16 includes a buffer 24, a digital data processor, random access memory 28 and print engine 34. It also typically includes read-only memory, I/O interfaces, and data transfer paths and busses, none of which are shown.

The digital data processor may be a general or special purpose microprocessor operating under control of computer program instructions executed from a memory. The processor may include a number of special purpose sub-processors, each sub-processor for executing particular portions of the computer program instructions. In the embodiment illustrated in FIG. 1, the processor includes an interpreter 50, a raster image processor (RIP) 52 and blend processor 58.

Each sub-processor may be a separate circuit able to operate substantially in parallel with the other sub-processors. Some or all of the sub-processors may be implemented as computer program processes (software) tangibly stored in a memory that perform their respective functions when executed. These may share an instruction processor, such as a general purpose integrated circuit microprocessor, or each sub-processor may have its own processor for executing instructions. Alternatively, some or all of the sub-processors may be implemented in an ASIC (application specific integrated circuit).

RAM 28 is a random access memory used by the processor and sub-processors 50, 52 and 58. RAM 28 may include display list memory 60, a frame buffer 62, any number of layer buffers 63 and a layer table 65 including a current buffer pointer 66. RAM 28 may be partitioned into one or more regions or embodied in one or more separate memory devices.

Preferably layer buffers 63 are dynamically allocated and may be used for storing pixel data associated with one or more layers of an output image. A layer buffer typically is sized smaller than a frame buffer and may be dynamically sized based on the data objects required to be drawn into a given layer. Each layer buffer 63 may be structured similar to a frame buffer and may be divided into one or more bands. Alternatively, the structure of the layer buffers may be independent of the frame buffer structure and may be optimized based on a specific implementation. For example, a particular printing device may include a banded frame buffer, that is, a frame buffer that is divided into a plurality of bands, into which object data may be painted covering a predefined portion of a page to be printed. In order to achieve a desired visual effect, a user may desire to blend two or more layers of graphics objects within a single band of the frame buffer. In this example the frame buffer is a band device; however, the implementation of the layer buffers needed to provide a layer blend within a single band does not require the layer buffers to be similarly structured.

Frame buffer 62 may be a deep or shallow frame buffer. A shallow frame buffer is configured to store render data typically having a bit depth of one (1) bit per pixel. A deep frame buffer is configured to store render data typically having a bit depth of greater than one (1) bit per pixel. Manipulation of shallow buffer data in order to achieve blending is described in detail in "Dehalftoning of Digital Images" by Steve Carlsen cited above. In order not to obscure the present invention, a deep frame buffer example will be described herein. Frame buffer 62 may be used to store objects rendered into a background layer of an output image, while layer buffers 63 may be used to store foreground rendered data prior to blending with the background layer. In addition, frame buffer 62 may be used to store resultant data derived from a blend of one or more layers and the background.

Layer table 65 may be used to store layer data and can include memory address information indicating where in memory data associated with a given layer is stored, blending instructions and a current buffer pointer.

Objects received by interpreter 50 may be interpreted into display list data for storage in display list memory 60. Alternatively, graphics data objects may be immediately painted by RIP 52 as pixelmaps into frame buffer 62 or a layer buffer 63. RIP 52 may paint objects opaquely into frame buffer 62 or layer buffers 63. Alternatively blending of individual objects at the layer level may be achieved as is described in "Blending Graphics Objects in a Frame Buffer" by Stephen Carlsen, Lars Borg and Stephen Schiller as cited above.

RAM 28 may be embodied in one or more memory chips. If display list memory 60 and the frame buffer 62 are consolidated into a single memory (a consolidated memory), then the memory may be partitioned or otherwise mapped to reflect the boundaries of the various memory sub-components.

Data flow, rather than physical interconnection, is illustrated between elements of printer 16. Processor and memory components are physically interconnected using a conventional bus architecture.

The printer components that have been described can be packaged in a single product; alternatively, some can be included in computer 12 or otherwise housed separately.

For concreteness, initially a two layer example in a single color space will be described. Application of the invention to other color space representations of an graphics object are similar.

Figure 2:
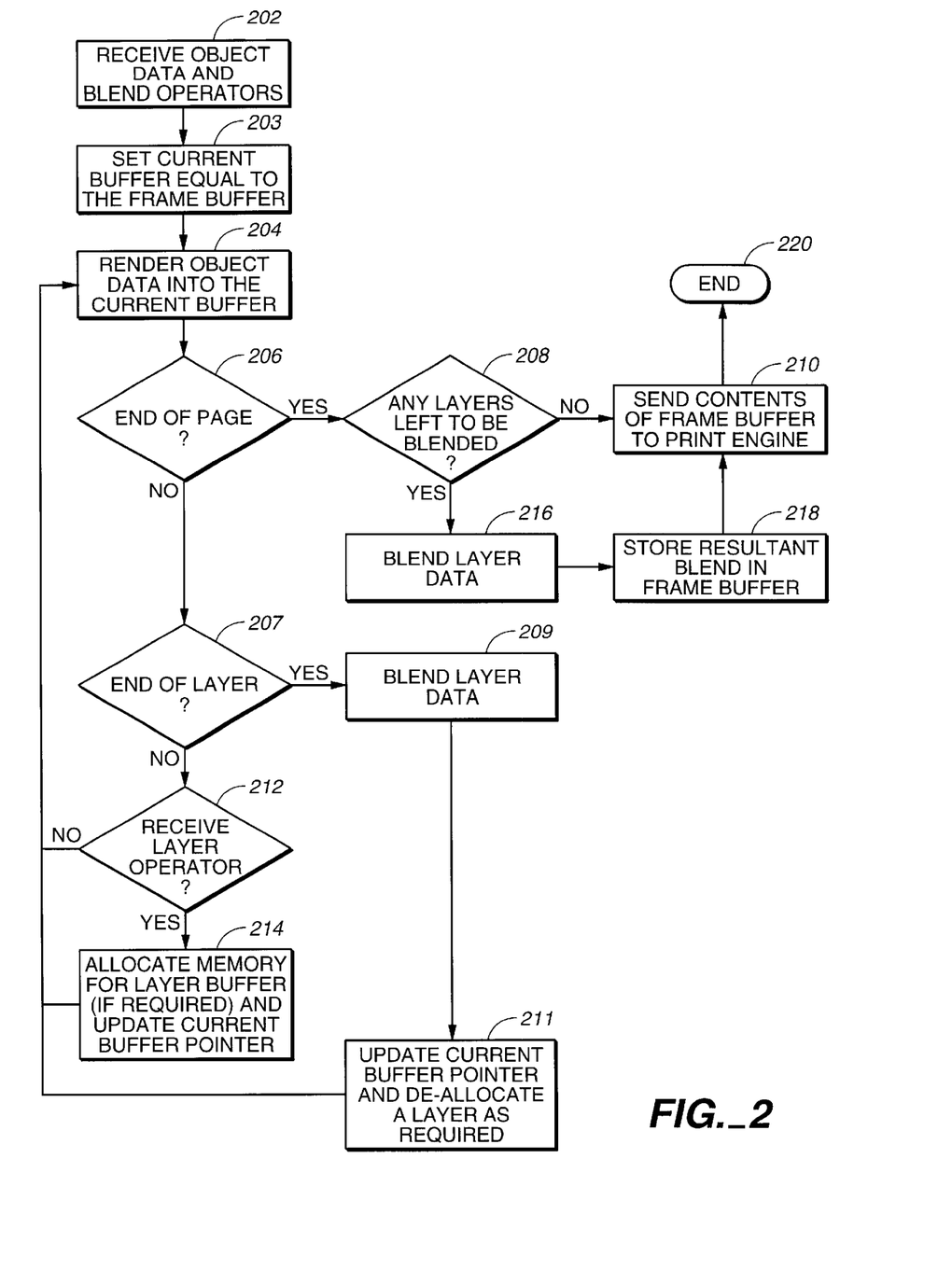
FIG. 2 is a flow chart of a process for implementing blending in a printer using layers.

Referring now to FIGS. 1 and 2, a conventional rendering and marking process for a raster output device is enhanced by the addition of a method for implementing blending by layers.

Printer 16 may be configured to a default mode by setting a current buffer pointer to point to frame buffer 62 (203). In the default mode, interpreter 50 directs the output of RIP 52 so that data objects received may be painted directly into frame buffer 62 (the "default layer").

Alternatively, RIP 52 may paint objects received directly into an designated layer buffer. Step 204 results in the painting of object data into a "current buffer", that is, either a layer buffer or the frame buffer depending on the location indicated by the current buffer pointer. The current buffer pointer may be maintained by interpreter 50 and modified upon receipt of a tag (herein after a "layer operator") that precedes or accompanies a particular graphics object. For example, the frame buffer may be used to store background data associated with a background layer and may be written to as the current buffer whenever background data is provided from computer 12. To transition to a foreground layer, a foreground data object including a layer operator may be used to update the current buffer pointer to point to a layer buffer thereby enabling RIP 52 to directly paint foreground render data into the appropriate foreground layer location in memory.

Upon receipt of a layer operator (212), interpreter 50 processes the layer operator by allocating a portion of memory (a layer buffer) to store layer data and directs the painting of objects associated with the designated layer from the RIP to the layer buffer by setting the current buffer pointer (214).

When all the objects for a particular layer have been painted into a layer buffer (207), the layer buffer may be blended by blend processor with another layer according to blending instructions received from computer 12 (209). The blend results in a single layer (two layers blended into one). The blending may result in the deallocation of memory associated with one of the original layers and may result in an update to the current buffer pointer (211). The process continues until the end of the page is reached (206).

When the end of the page is reached, blending processor checks to determine if any outstanding layers remain to be blended (208). If no layers remain to be blended, the page may be printed by passing data from the frame buffer 62 directly to the print engine 34 (210). If any layers remain to be processed, then the layers may be blended by blending processor 58 (216). Alternatively, outstanding layer buffers may be held over for a next page, discarded, or otherwise processed by blending processor 58.

The result of any layer blending may be stored in the frame buffer 62 (218). At the completion of the blending operation, resultant data stored in frame buffer 62 may be transferred to print engine 34 for printing (210). Thereafter the process may end (220).

The objects associated with one layer may be received sequentially prior to the receipt of any objects associated with a second layer as is described above. Alternatively, object data may be received in random order.

Blending

Layers may be blended according to blending information provided from computer 12. The blending information may define both the timing and algorithm to be used in the blending operation. Various blending algorithms may be invoked by blending processor 58 to blend two layers. Blending processor 58 combines the pixel values at each location in the layers according to an appropriate blending formula. Examples of blending formulas include:

| Blending Mode | Formula |
| --- | --- |
| Transparency (Alpha blending) | N = F * opacity + B * (1 − opacity) |
| Shadow | Sh = Normal * B |
| Screen | Scr = N + B − (N * B) |
| Darker | Drk = Min (N, B) |
| Lighter | Ltr = Max (N, B) |
| Add | Add = N + B |
| Overprint | Ovr = N + B − 1 | where N is Normal (transparency), F is foreground data, B is background data, and opacity is between 0 and 1.

Blending processor 58 may support one or more of the blending formulas. A user-defined selection for the method to be used may be provided by computer 12 in the form of blending instructions as part of a layer operator. The instructions may be stored in layer table 65 for retrieval at the time for blending.

Memory Saving Techniques

I. Compression

Figure 3A:
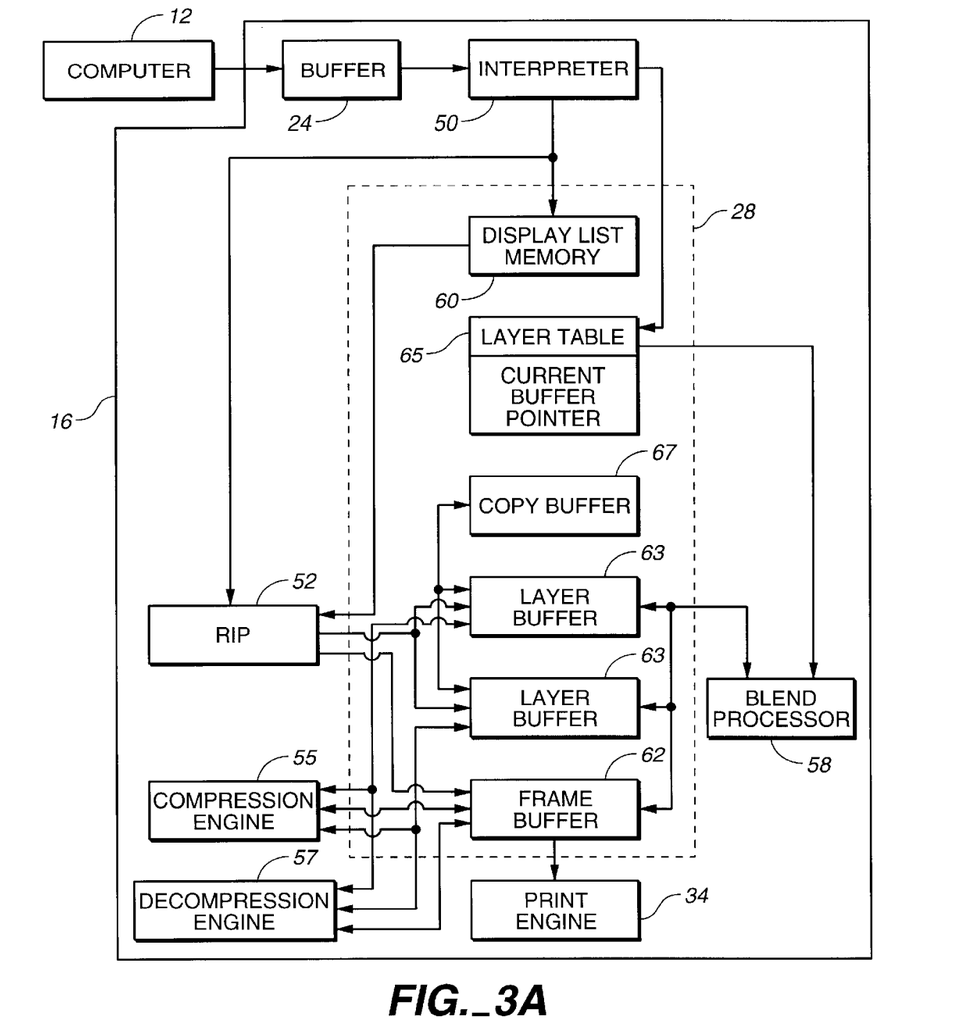
FIG. 3a is a block diagram of the printer of FIG. 1 including compression and decompression mechanisms.
Figure 3B:
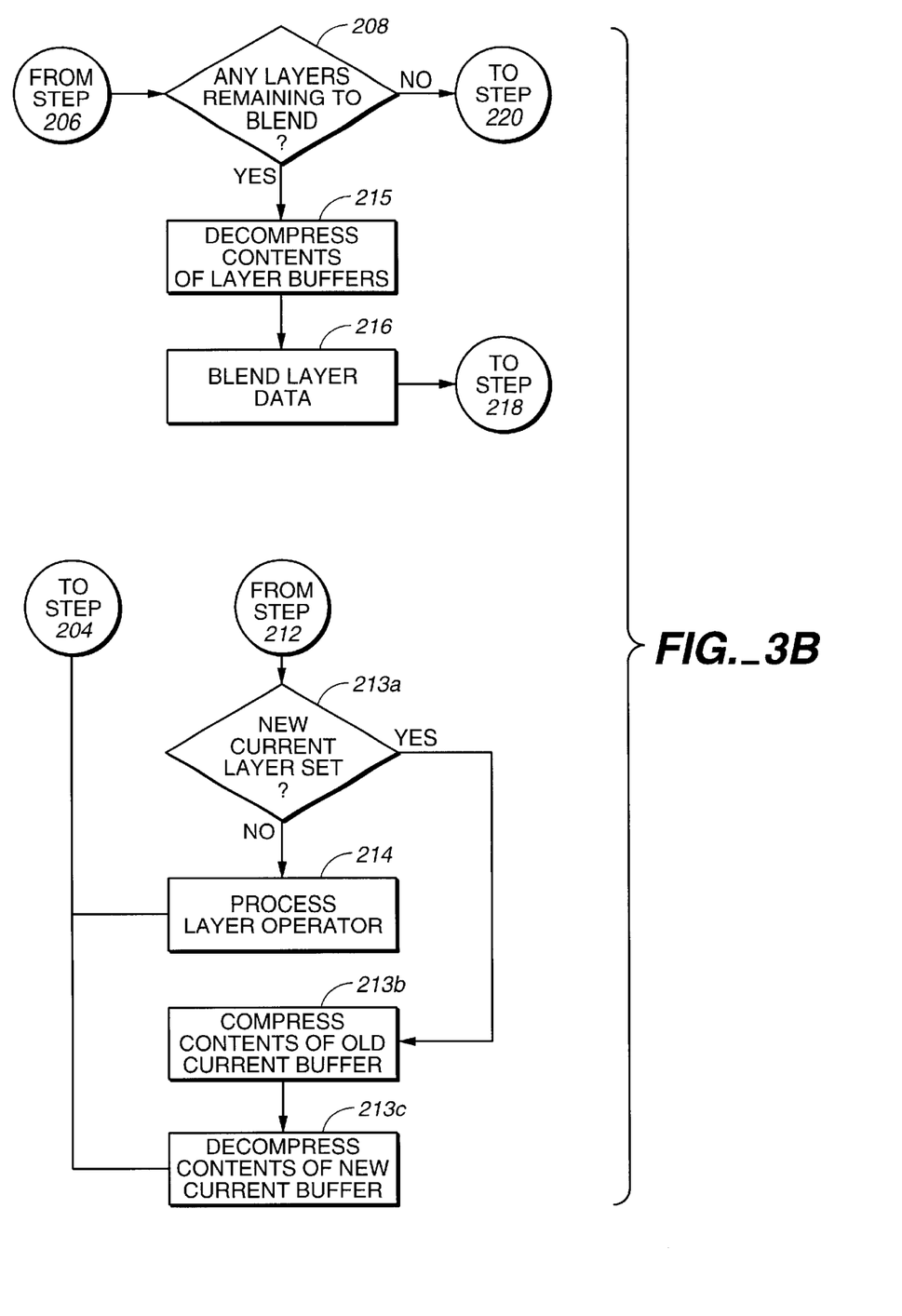
FIG. 3b is a flow chart of a process for minimizing memory in a display device using compression and blending with layers.

Referring now to FIGS. 3*a* and 3*b*, printer 16 may include compression 55 and decompression engines 57. Compression engine 55 may be used to compress data stored in a buffer that is not the current buffer. Conversely, decompression engine 57 may be used to decompress compressed data stored in a buffer prior to the addition of more objects or the blending of data with data from another buffer. If compression techniques are employed, the process 200 for blending layers is modified to include a step of determining if graphics objects are to be rendered into a new buffer (e.g., the frame buffer or a layer buffer) by determining if a new current buffer is indicated (213*a*). Objects received from computer 12 are required to be written to a new buffer when the current buffer being painted into by the RIP is not the same buffer into which subsequent objects are to be rendered. If no new current buffer is set, then the process continues at step 214.

If a new current buffer instruction is detected, then the contents of the current buffer (either the frame buffer or a layer buffer) may be compressed (213*b*). Thereafter, the contents of the new current buffer may be decompressed as appropriate prior to painting more object data into the new current buffer (213*c*). Decompression may also be added if a layer operation requires the blending of layers or the writing of new data to a previously compressed buffer. In addition, a decompression step (215) may be required to be added prior to the blending step 216 to decompress data stored in at least one layer buffer 63.

II. Band Buffers

Figure 4:
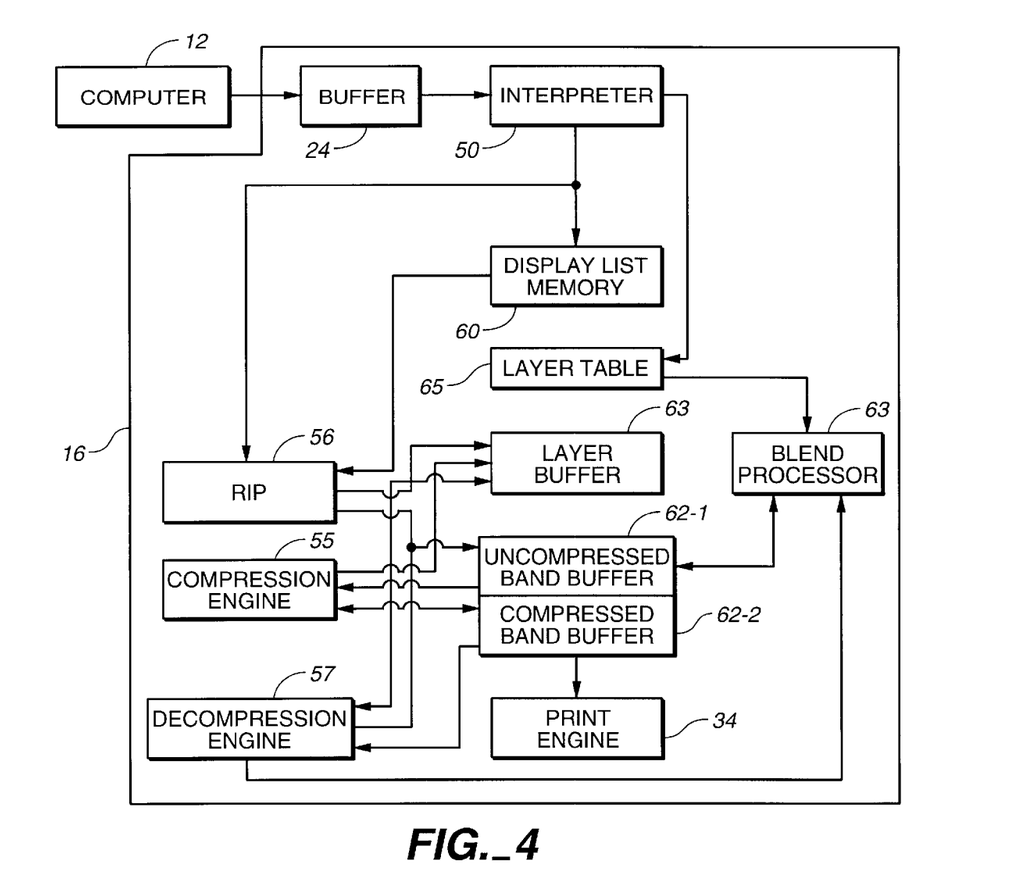
FIG. 4 is a block diagram of printer according to the invention for a band system.

Referring now to FIG. 4, frame buffer 16 may be divided to include an uncompressed band buffer 62-1 and compressed band buffer 62-2. Uncompressed band buffer 62-1 may be sized to hold one or more bands of uncompressed render data. Compressed band buffer 62-2 may be sized to store a compressed form of the render data. Each layer buffer 63 may be similarly configured to include an uncompressed and a compressed portion (not shown). The uncompressed portion may be used to paint data directly from RIP 52, while the compressed portion may be used to store one or more compressed bands of previously rendered data. Alternatively, the frame buffer and layer buffers may share an uncompressed band buffer into which all rendered data is written by RIP 52.

In a band or tiling system, only a portion of a frame buffer or layer buffer is maintained in uncompressed form, while the remainder of the bands associated with a buffer that are not presently being drawn into are maintained in a compressed form. Interpreter 50 receives object data from computer 12 and stores the object data in display lists in display list memory 60. When all of the objects for a given band have been received (or if the display list memory for a given band is full), RIP 52 may render the object data stored in the display list for the given band painting directly into a band of the uncompressed band buffer 62-1. When all of the objects of the display list have been painted into the uncompressed band buffer 62-1, compression engine 55 may be invoked to compress the data for the band and store the resultant compressed data in the compressed band buffer 62-2 or in the compressed portion of a layer buffer.

If all of the data objects associated with a band are not received at the time for rendering a display list to the uncompressed band buffer, then a cycling operation may be invoked. In a cycling operation, a band of previously compressed data may be decompressed and stored in the uncompressed band buffer 62-1. Objects may then be rendered into the band by RIP 52. After all of the data objects for a display list associated with the band are processed, the band may again be compressed and stored in the compressed band buffer 62-2 or in the compressed portion of a layer buffer.

If layer buffers 63 are configured in a band architecture, the process for blending layers may require decompressing compressed bands of a given layer prior to blending with a corresponding band associated with another layer.

Multi-layer Systems

The description above is directed to printing a two layer blend, as might be used in blending a foreground layer, stored in a layer buffer, with a background layer, stored in the frame buffer, to achieve a desired visual effect. More complex visual effects may be achieved by including more than two layers. In order to achieve such results, a hierarchy for blending is required to be provided from the host computer or may be inferred by the display device.

An Inferred Layer Stack

Referring again to FIG. 1, printer 16 may include a layer stack embodied in layer table 65. Stacking of layers may be inferred from the order of layer data is created or received. In a simple layer implementation, computer 12 may provide a layer operator that designates the transition between layers and blending instructions for blending the new layer with its parent layer in the layer stack. A log of such layer operators may be maintained in layer table 65 by interpreter 50. Each entry in the layer table may be associated with a single layer. At the time for blending (after all graphics objects have been processed for a given page), layers may be blended in reverse order received, two layers at a time, by the blending processor according to the blending instructions.

Page Description Language Defined Structure

While the inferred structure allows for very simple layer operators to be used, a more complicated structure of layers may be desirable in order to achieve complex visual effects. Blending instructions may be included with the layer operator that define the order in which the layers may be blended (e.g., layer one with layer three, the composite of which is blended with layer two). In addition, more complex blends may be achievable by nesting layers in the hierarchy and allowing for the control over when layers are to be blended, as opposed to at the end of processing of all graphics objects associated with a given page.

A page description language structure for blending layers may include a layer stack architecture and at least three types of layer operators. The layer operators may be provided by computer 12 to direct printer 16 to perform a desired blend.

A create layer operator may be used to designate a new layer. In response to a create layer operator, interpreter 50 creates an new entry in layer table 65. A create layer operator may be required for each layer in an graphics data blend. As create layer operators are processed, layers are "pushed" onto a stack embodied in the layer table 65. Parent and sibling relationships in the hierarchical stack can be defined for each layer created.

A current layer operator may be used to designate that the objects following (or accompanying) the operator belong to a certain layer. In response to a current layer operator, the interpreter may direct the transfer of rendered data from RIP 52 to a layer buffer. The current layer operator operates much the same as the layer operator described in conjunction with FIG. 2. The processing of a current layer operator has no effect on the contents of the hierarchical stack.

A render layer operator may be used to invoke the blending of layers on the stack. The render layer operator may take the form of a pop instruction. In response to a pop instruction, the blend processor may pop a layer from the stack (a child layer), blend the layer with its parent layer in the hierarchical stack, and store the result in the parent layer buffer. The pop operation results in the removal (deallocation) of an element from the layer table (the child layer) and a modification to the parent layer as a result of the blending operation.

Figure 5:
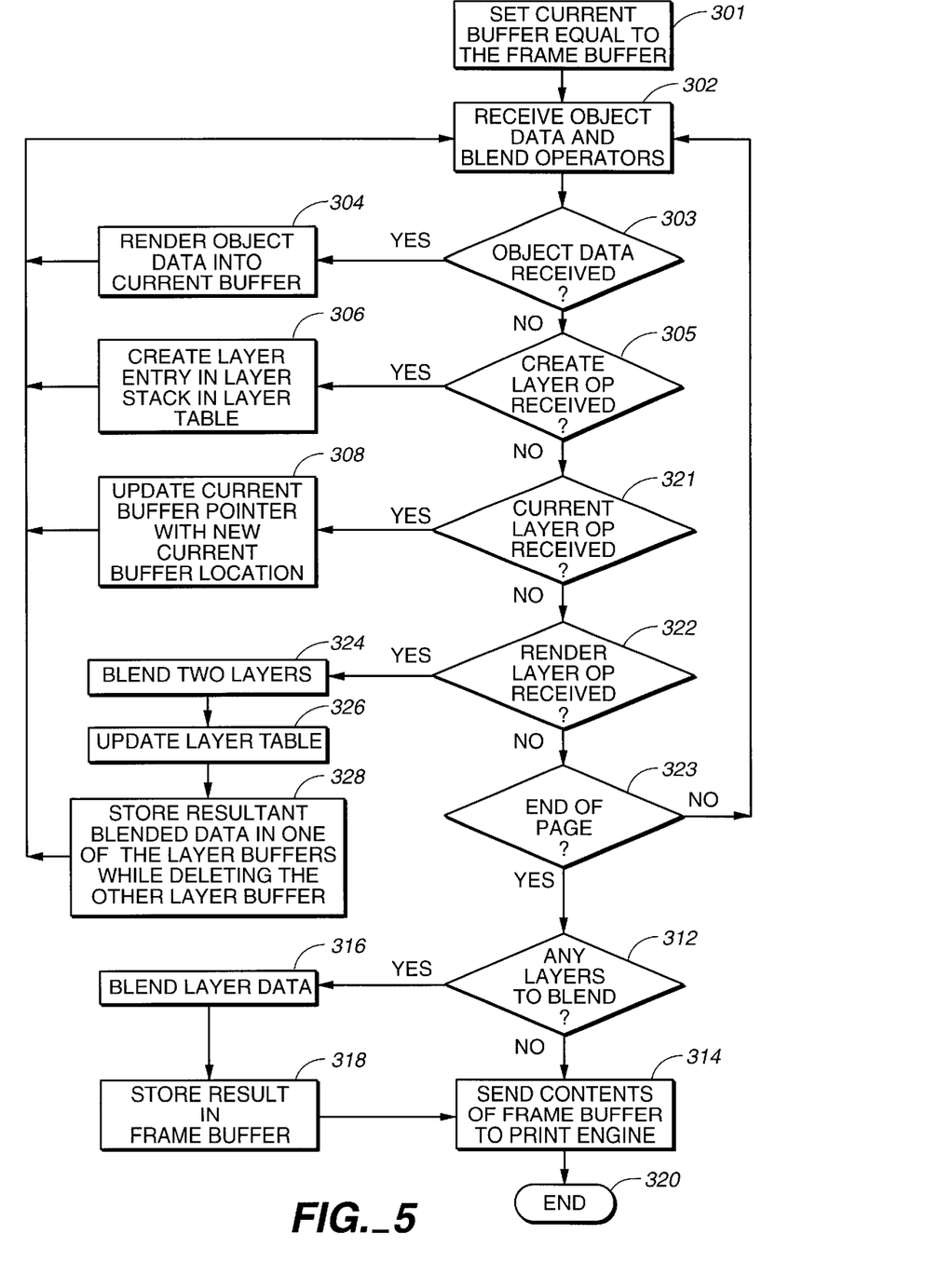
FIG. 5 is a method of implementing a stack architecture using page description operators in a output display device for processing multiple layers of an output image.

Referring now to FIG. 5, a process for blending layers in a system including layer operators defining a layer stack is shown. The process includes initializing the current buffer pointer to point to the frame buffer (301). Objects and layer operators are received from a computer 12 to be processed (302). If object data is received (303), the graphics objects are processed by RIP 52 and painted directly into the current buffer (304).

If a create layer operator is received (305), an entry is added to the layer table (306), and the process continues at step 304. Each entry in the layer table may include a layer identifier, a buffer identifier, and a compression flag. A buffer identifier identifies the location in RAM 28 where data associated with the layer is stored (either a layer buffer or the frame buffer). The compression flag indicates whether or not the layer data is in a compressed form and thus requires decompression prior to retrieval, blending or other processing.

If a current layer operator is received (321), the current buffer pointer is updated (308) and the process continues at step 304.

If a render layer operator is received (322) then two layers on the stack are blended by the blend processor 58 (324). The layer operator may define which two layers are to be blended or a default selection may be made to blend the last two layers added to the stack, the last layer and the current layer (as indicated by the current buffer pointer) or other another pair of layers. The layer table is updated to remove one of the layers from the stack (326), and the resultant layer data derived from the blending operation is returned to be stored in the other layer buffer (328).

The process continues until all graphics objects associated with the page are processed (323). Thereafter, a check is made to determine if more than one layer is present (312). If not, then the contents of the frame buffer may be transferred directly to the print engine for printing (314) and thereafter the process ends (320). If layers are present, blending processor 58 blends the layers according to the stack order two layers at a time until all the layers are blended (316) and then passes the resultant data to the frame buffer (318). The blend processor processes layers from the stack by combining the last layer created with its parent on the stack (the previous layer received in time). The resultant image is then combined with the next layer in the stack hierarchy until all of the layers have been blended, the result of which may be blended with the contents of the frame buffer. Other default hierarchies may be employed. For example, all layers that are children of a parent layer in the hierarchy may be blended before blending a parent layer with a "sibling" layer within the same hierarchical level.

Nesting

Figure 6A:
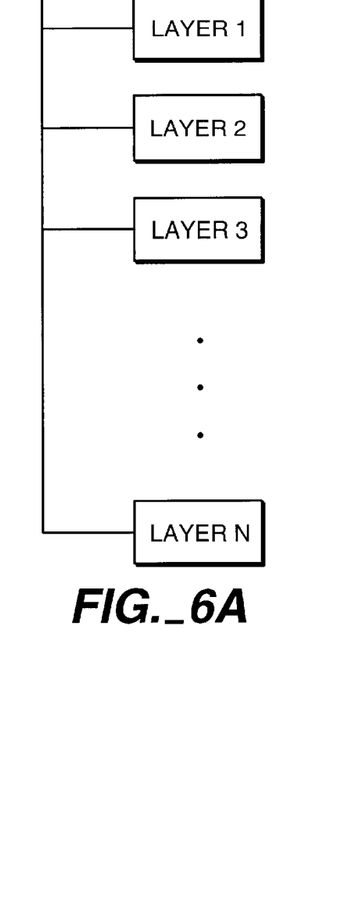
FIG. 6a is a diagram of an example of a blending hierarchy achievable with a simple layer operator according to the invention.
Figure 6B:
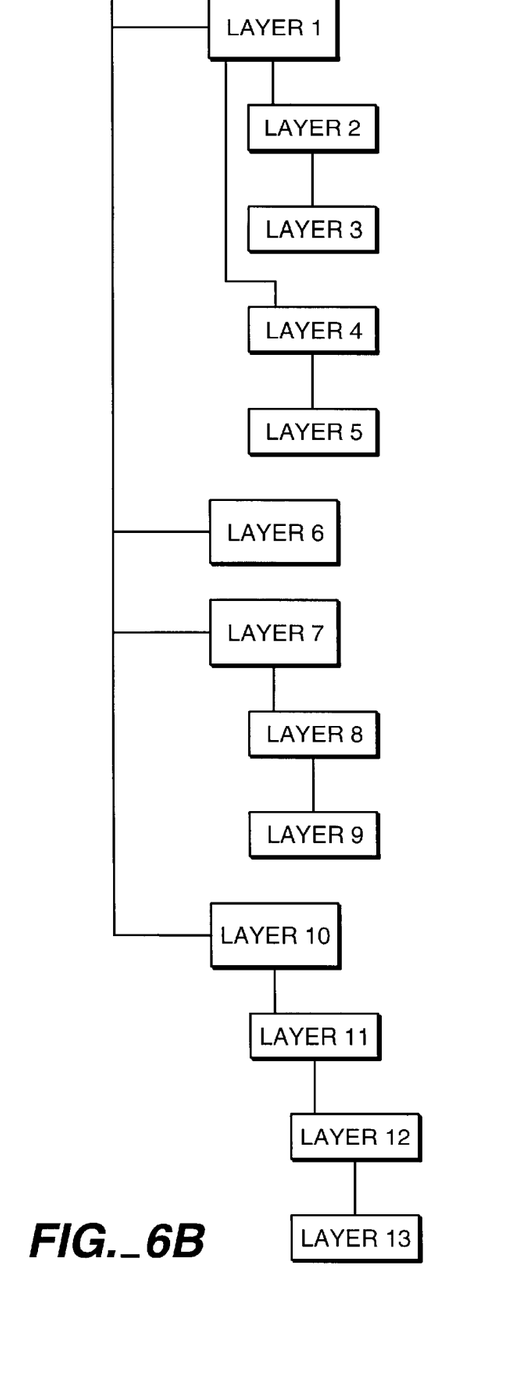
FIG. 6b is a diagram of an example of a blending hierarchy achievable with intermediate blending according to the invention.

The render layer and create layer operators allow for the creation of complex blending hierarchies. Referring now to FIG. 6a, the create layer operator allows for the ordering of layers in a stack. In the example shown, when all the objects associated with a given page have been processed, a blend of the layers in the stack in reverse order received results in a single level hierarchy. Referring now to FIG. 6b, a more complex hierarchy may be realized by using the render layer operator in conjunction with the create operator. Nesting of layers in a parent/child hierarchy is achievable by sequencing the creation of layers along with blending of layers prior to the final blend time for the given page. These intermediate blends allow greater freedom to produce desired visual effects.

Blending a Layer into two or more Layers

In order to achieve a complex visual effect, a single layer may be desired to be blended into a plurality of other layers. One method for achieving this in printer 16 is to blend layers (e.g., a parent and a child layer) and draw the result of the blend back into one of the two layers (the parent layer) without affecting the contents of the second layer (the child layer).

Referring again to FIG. 1, another method of achieving this in a printer 16 is to include a copy buffer 67. Copy buffer 67 may be used to store a copy of the data in the frame buffer so that the same layer may be blended with multiple layers in a hierarchy. The copy buffer may advantageously be used in conjunction with a render layer operator to achieve a desired visual effect.

ALTERNATIVE EMBODIMENTS

One of ordinary skill will recognize that the principles disclosed herein may be equally well suited to other printer configurations. For example, blending of graphics data may be ideally performed prior to the conversion of object data into pixel data by RIP 52. "Blending with Planar Maps" by Lars Borg et. al. cited above, describes a method and apparatus for blending graphics objects using planar maps. Planar maps may be drawn into and used to blend graphics objects prior to the rasterization process. The teachings of the present invention are equally well suited to a planar map blending method. One or more layers of planar maps may be computed and stored in a display device to facilitate blending operations and the creation of complex visual effects. Each layer of memory may be used to store one or more planar maps representative of a grouping of one or more graphics objects to be combined. In a planar map embodiment, one difference arises in the blending of planar maps and the allocation of memory. Planar maps may be combined to derive a composite map representative of the blending of the two planar map representations. However, a separate portion of memory must be allocated to store the resultant planar map (an existing planar map cannot be simply drawn into as is the case when operating on a pixel by pixel blend when using a frame buffer). Other blending methodologies may be utilized in addition to blending at the pixel level or the planar map level as described above. No matter the form or timing of the blend, the use of layers provides a flexible hierarchy for blending objects and may be realized by practicing the teachings of the present invention.

The present invention has been described in terms of specific embodiments, which are illustrative of the invention and not to be construed as limiting. The invention may be implemented in hardware, firmware or software, or in a combination of them. Other embodiments are within the scope of the following claims.

What is claimed is:

1. A method of blending graphics data, the graphics data including a plurality of objects, the method comprising:

grouping the objects into a first and second layer;

drawing the objects associated with the first layer including computing a planar map representation of the objects;

drawing the objects associated with the second layer including computing a planar map representation of the objects; and blending data drawn into the first and second layers.

2. A method of blending graphics data, the graphics data including a plurality of objects, the method comprising:

grouping the objects into a first and second layer;

drawing the objects associated with the first layer;

drawing the objects associated with the second layer, wherein the data drawn into one of the first and second layers is drawn into a layer buffer, the layer buffer being partitioned into a plurality of tiles, each tile for receiving data associated with a particular portion of a page to be printed, the method including compressing tiles of the layer buffer into which data is not currently being drawn; and blending the drawn data into the first and second layers.

3. The method of claim 2 wherein the layer buffer is partitioned into a plurality of bands.

4. A method of blending graphics data, the graphics data including a plurality of objects, the method comprising:

grouping the objects into a first and second layer;

drawing the objects associated with the first layer;

drawing the objects associated with the second layer; and blending data drawn into the first and second layers according to a predefined blending operation, wherein the predefined blending operation is selected from the group of trasnsparency, shadow, overprinting, darkening, lightening, screen effect and additive effect.

5. An apparatus for blending graphics data in a output display device comprising:

an interpreter for receiving object data associated with two layers of an image to be displayed by the output display device and for receiving a layer operator for designating which objects belong to which layer;

a drawing engine for drawing objects into a first and a second buffer, the first buffer for receiving data associated with a first layer and the second buffer for receiving data associated with a second layer, wherein one of the first and second buffers is a layer buffer, the layer buffer being partitioned into a plurality of bands, each band for receiving data associated with a particular portion of a page to be displayed, the apparatus including a compression engine for compressing bands of the layer buffer into which data is not currently being drawn; and a blend processor for blending data in the first and second buffers prior to display.

6. A method of blending graphics data, the graphics data forming a page including a plurality of objects, the method comprising:

receiving the page including the plurality of objects, each object including a layer operator;

grouping the plurality of objects into a first and a second layer based on the layer operator;

drawing the objects associated with the first layer; and drawing the objects associated with the second layer;

the drawing steps include rendering object data to generate a pixelmap.

7. A method of blending graphics data, the graphics data forming a page including a plurality of objects, the method comprising:

receiving the page including the plurality of objects, each object including a layer operator;

grouping the plurality of objects into a first and a second layer based on the layer operator;

drawing the objects associated with the first layer; and drawing the objects associated with the second layer herein objects are drawn opaquely into each layer.

8. A method of blending graphics data in an output display device, the graphics data forming a page including a plurality of objects, the method comprising:

receiving the page including the plurality of objects, each object including a layer operator;

providing groupings of objects into layers based on the layer operator;

providing layer blending information defining a hierarchy for blending layers of the page;

rendering object data associated with each layer; and blending rendered object data for the layers using the defined hierarchy wherein the blending step is performed two layers at a time including selecting layers for blending based on the layer blending information.

* * * * *

UNITED STATES PATENT AND TRADEMARK OFFICE
CERTIFICATE OF CORRECTION

PATENT NO. : 6,466,210 B1
DATED : October 15, 2002
INVENTOR(S) : Stephen E. Carlsen et al.

It is certified that error appears in the above-identified patent and that said Letters Patent is hereby corrected as shown below:

Column 12,
Line 51, please delete "a" and replace it with -- an --.

Column 14,
Line 3, please delete "herein" and replace it with -- wherein --.

Signed and Sealed this

Tenth Day of June, 2003

JAMES E. ROGAN
*Director of the United States Patent and Trademark Office*